United States Patent
Lee et al.

(10) Patent No.: US 11,384,183 B2
(45) Date of Patent: Jul. 12, 2022

(54) HYBRID SUPPORTED METALLOCENE CATALYST AND METHOD FOR PREPARING OLEFIN POLYMER USING THE SAME

(71) Applicant: LG Chem, Ltd., Seoul (KR)

(72) Inventors: Ye Jin Lee, Daejeon (KR); Eun Kyoung Song, Daejeon (KR); Daesik Hong, Daejeon (KR); Hye Kyung Lee, Daejeon (KR); Joongsoo Kim, Daejeon (KR); Eunyoung Shin, Daejeon (KR); Jinyoung Kwak, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 17/043,194

(22) PCT Filed: Jan. 15, 2020

(86) PCT No.: PCT/KR2020/000748
§ 371 (c)(1),
(2) Date: Sep. 29, 2020

(87) PCT Pub. No.: WO2020/149643
PCT Pub. Date: Jul. 23, 2020

(65) Prior Publication Data
US 2021/0054120 A1     Feb. 25, 2021

(30) Foreign Application Priority Data

Jan. 17, 2019   (KR) .................. 10-2019-0006226
Dec. 20, 2019   (KR) .................. 10-2019-0172478

(51) Int. Cl.
| | | |
|---|---|---|
| C08F 4/653 | (2006.01) | |
| C08F 4/6592 | (2006.01) | |
| C08F 210/16 | (2006.01) | |
| C08L 23/08 | (2006.01) | |
| C07F 17/00 | (2006.01) | |
| C08F 4/659 | (2006.01) | |

(52) U.S. Cl.
CPC .......... *C08F 210/16* (2013.01); *C07F 17/00* (2013.01); *C08F 4/65904* (2013.01); *C08L 23/0815* (2013.01); *C08F 4/65925* (2013.01); *C08F 4/65927* (2013.01)

(58) Field of Classification Search
CPC ............ C08F 4/65904; C08F 4/65925; C08F 4/65927; C08F 210/16; C08L 23/0815
See application file for complete search history.

(56) References Cited

U.S. PATENT DOCUMENTS

| | | |
|---|---|---|
| 7,294,600 B2 | 11/2007 | Lee et al. |
| 2006/0235171 A1 | 10/2006 | Lee et al. |
| 2010/0121006 A1 | 5/2010 | Cho et al. |
| 2012/0172548 A1 | 7/2012 | Cho et al. |
| 2019/0135961 A1 | 5/2019 | Joung et al. |
| 2020/0048381 A1 | 2/2020 | Sun et al. |

FOREIGN PATENT DOCUMENTS

| | | |
|---|---|---|
| EP | 3712182 A1 | 9/2020 |
| KR | 20040085650 A | 10/2004 |
| KR | 20080097949 A | 11/2008 |
| KR | 20160057930 A | 5/2016 |
| KR | 20160078290 A | 7/2016 |
| KR | 101711788 B1 | 3/2017 |
| KR | 20170055149 A | 5/2017 |
| KR | 20170073463 A | 6/2017 |
| KR | 20170075533 A | 7/2017 |
| KR | 101773722 B1 | 8/2017 |
| KR | 20180054443 A | 5/2018 |
| KR | 20180099269 A | 9/2018 |
| KR | 20190074959 A | 6/2019 |

OTHER PUBLICATIONS

Search report from International Application No. PCT/KR2020/000748, dated May 8, 2020.
Fleissner. "Langsames Rißwachstum und Zeitstandfestigkeit von Rohren aus Polyethylen." Kunststoffe, 1987, pp. 45-50, vol. 77, No. 1. (Machine generated translation of abstract attached.).
Supplementary European Search Report for Application No. 20742086 dated Aug. 9, 2021. 2 pgs.

*Primary Examiner* — Caixia Lu
(74) *Attorney, Agent, or Firm* — Lerner, David, Littenberg, Krumholz & Mentlik, LLP

(57) ABSTRACT

A catalyst composition, a method from preparing an olefin polymer using the same, and an olefin polymer prepared from the same are disclosed herein. In some embodiments, a catalyst composition includes a first metallocene compound represented by the Chemical Formula 1, a second metallocene compound represented by the Chemical Formula 2, and a support. The catalyst composition can exhibit high activity in an olefin polymerization reaction and thus contribute to reducing catalyst costs, and can also exhibit high copolymerizability which can secure excellent processability and long-term physical properties, and thus, is suitable for providing polymers for pipes.

12 Claims, No Drawings

HYBRID SUPPORTED METALLOCENE CATALYST AND METHOD FOR PREPARING OLEFIN POLYMER USING THE SAME

CROSS-REFERENCE WITH RELATED APPLICATION(S)

The present application is a national phase entry under 35 U.S.C. § 371 of International Application No. PCT/KR2020/000748, filed on Jan. 15, 2020, which claims priority from Korean Patent Application No. 10-2019-0006226, filed on Jan. 17, 2019, and Korean Patent Application No. 10-2019-0172478, filed on Dec. 20, 2019, the disclosures of which are incorporated herein by reference.

TECHNICAL FIELD

The present disclosure relates to a hybrid supported metallocene catalyst having high activity and high polymerizability, and a method for preparing an olefin polymer using the same.

BACKGROUND ART

In the existing commercial preparation process of polyolefin polymer, Ziegler-Natta catalysts of titanium or vanadium compounds have been widely used. Although the Ziegler-Natta catalyst has high activity, it is a multi-active site catalyst and thus the molecular weight distribution of the produced polymer is wide and the compositional distribution of comonomers is not uniform, and thus, has a limit in securing desired physical properties.

Thus, recently, a metallocene catalyst in which a ligand comprising a cyclopentadiene functional group is bound to a transition metal such as titanium, zirconium, hafnium, etc. has been developed and widely used. The metallocene compound is generally activated with aluminoxane, borane, borate or other activators before use. For example, a metallocene compound having a ligand comprising a cyclopentadienyl group and two sigma chloride ligands uses aluminoxane as an activator. Such a metallocene catalyst is a single site catalyst having one kind of an active site, and it has advantages in that the molecular weight distribution of the produced polymer is narrow, and that the molecular weight, stereoregularity, degree of crystallinity, particularly reactivity of comonomers may be controlled according to the structure of the catalyst and the ligand. However, polyolefin polymer polymerized using a metallocene catalyst has narrow molecular weight distribution, and if applied for some products, productivity is remarkably decreased due to extrusion load and the like, rendering site application difficult.

In particular, in the case of an existing PE-RT (Polyethylene-Raised Temperature) pipe product, although it is an ethylene copolymer using a metallocene catalyst, there is an advantage in that the molecular weight distribution is narrow and thus, desired physical properties can be obtained. On the other hand, there is a problem that due to the narrow molecular weight distribution, long-term physical properties such as full notch creep test (FNCT) and processability decrease compared to a conventional PE-RT pipe.

Technical Problem

It is an object of the present disclosure to provide a hybrid supported metallocene catalyst which can complement disadvantages in product processing by improving BOCD (broad orthogonal comonomer distribution) and melt flow rate ratio (MFRR), and can prepare an olefin polymer for pipes with excellent physical properties, and a method for preparing an olefin polymer usi the same.

Technical Solution

In one aspect of the present disclosure, there is provided a hybrid supported metallocene catalyst comprising a first metallocene compound represented by the following Chemical Formula 1, a second metallocene compound represented by the following Chemical Formula 2, and a support supporting the first and second metallocene compounds

[Chemical Formula 1]

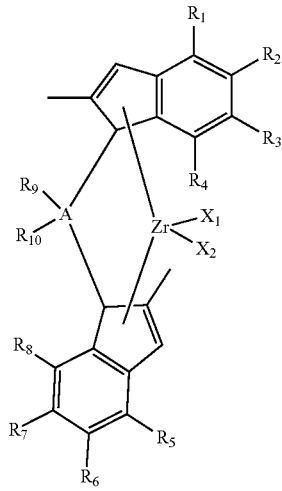

in Chemical Formula 1, $X_1$ and $X_2$ are each independently halogen, $R_1$ and $R_5$ are each independently $C_{6-20}$ aryl substituted with $C_{1-20}$ alkyl, $R_2$ to $R_4$ and $R_6$ to $R_8$ are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silyl ether, $C_{1-20}$ alkoxy, $C_{6-20}$ aryl, $C_{7-20}$ alkylaryl, or $C_{7-20}$ arylalkyl, A is carbon, silicon or germanium, and $R_9$ and $R_{10}$ are each independently $C_{1-2}$ linear alkyl; or $C_{3-10}$ linear alkyl substituted with $C_{1-10}$ alkoxy, wherein at least one of $R_9$ and $R_{10}$ is $C_{3-10}$ linear alkyl substituted with $C_{1-10}$ alkoxy,

[Chemical Formula 2]

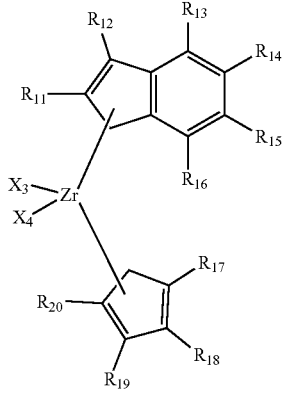

in Chemical Formula 2, $X_3$ and $X_4$ are each independently halogen, $R_{11}$ to $R_{20}$ are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silyl ether, $C_{1-20}$ alkoxy, $C_{2-20}$ alkoxyalkyl, $C_{6-20}$ aryl, $C_{7-20}$ alkylaryl, or $C_{7-20}$ arylalkyl, wherein at least one of $R_{11}$ and $R_{12}$ is $C_{2-20}$ alkoxyalkyl, and at least one of $R_{17}$ to $R_{20}$ is $C_{1-20}$ alkyl.

In another aspect of the present disclosure, there is provided a method for preparing an olefin polymer comprising subjecting an olefin monomer to a polymerization reaction in the presence of the hybrid supported metallocene catalyst.

In yet another aspect of the present disclosure, there is provided an olefin polymer which is prepared by the preparation method of the olefin polymer, and has a melt flow rate ratio (MFRR) of 22 to 50, a full notch creep test (FNCT) of 1000 to 3000 hr and a BOCD (broad orthogonal comonomer distribution) index of 0.8 to 3.0.

Advantageous Effects

According to the present disclosure, there can be provided a hybrid supported metallocene catalyst that can not only exhibit high activity and polymerizability during production of olefin polymers, but also slightly widen the molecular weight distribution of the synthesized olefin polymers to secure excellent processability and long-term physical properties, and further contribute to reducing catalyst costs, and a method for preparing an olefin polymer using the hybrid supported metallocene catalyst. Therefore, the olefin polymer prepared according to the method of the present disclosure is excellent in processability and long-term physical properties, and thus, is suitable for use in pipes.

DETAILED DESCRIPTION OF THE EMBODIMENTS

Hereinafter, a hybrid supported metallocene catalyst, a method for preparing an olefin polymer using the same, and an olefin polymer prepared therefrom according to specific embodiments of the present disclosure will be described.

According to one embodiment of the present disclosure, there is provided a hybrid supported metallocene catalyst comprising a first metallocene compound represented by the following Chemical Formula 1, a second metallocene compound represented by the following Chemical Formula 2, and a support supporting the first and second metallocene compounds

[Chemical Formula 1]

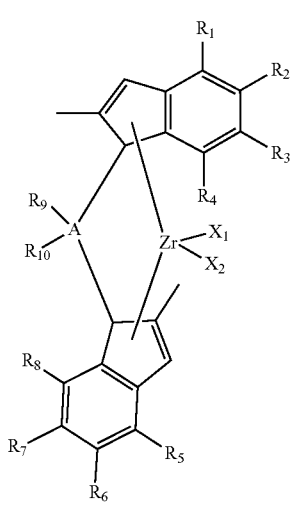

in Chemical Formula 1, $X_1$ and $X_2$ are each independently halogen, $R_1$ and $R_5$ are each independently $C_{6-20}$ aryl substituted with $C_{1-20}$ alkyl, $R_2$ to $R_4$ and $R_6$ to $R_8$ are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silyl ether, $C_{1-20}$ alkoxy, $C_{6-20}$ aryl, $C_{7-20}$ alkylaryl, or $C_{7-20}$ arylalkyl, A is carbon, silicon or germanium, and $R_9$ and $R_{10}$ are each independently $C_{1-2}$ linear alkyl; or $C_{3-10}$ linear alkyl substituted with $C_{1-10}$ alkoxy, wherein at least one of $R_9$ and $R_{10}$ is $C_{3-10}$ linear alkyl substituted with $C_{1-10}$ alkoxy,

[Chemical Formula 2]

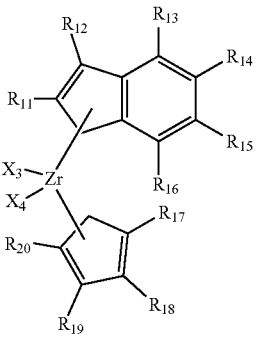

in Chemical Formula 2, $X_3$ and $X_4$ are each independently halogen, $R_{11}$ to $R_{20}$ are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silyl ether, $C_{1-20}$ alkoxy, $C_{2-20}$ alkoxyalkyl, $C_{6-20}$ aryl, $C_{7-20}$ alkylaryl, or $C_{7-20}$ arylalkyl, wherein at least one of $R_{11}$ and $R_{12}$ is $C_{2-20}$ alkoxyalkyl, and at least one of $R_{17}$ to $R_{20}$ is $C_{1-20}$ alkyl.

Unless specifically limited herein, the following terms may be defined as follows.

Halogen may be fluorine (F), chlorine (Cl), bromine (Br) or iodine (I).

A $C_{1-20}$ alkyl may be linear, branched or cyclic alkyl. Specifically, the $C_{1-20}$ alkyl may be $C_{1-20}$ linear alkyl; $C_{1-10}$ linear alkyl; $C_{1-5}$ linear alkyl; $C_{3-20}$ branched or cyclic alkyl; $C_{3-15}$ branched or cyclic alkyl; or $C_{3-10}$ branched or cyclic alkyl. More specifically, the $C_{1-20}$ alkyl may be methyl group, ethyl group, n-propyl group, iso-propyl group, n-butyl group, iso-butyl group, tert-butyl group, n-pentyl group, iso-pentyl group or cyclohexyl group, etc.

A $C_{2-20}$ alkenyl may be linear, branched or cyclic alkenyl. Specifically, the $C_{2-20}$ alkenyl may be $C_{2-20}$ linear alkenyl, $C_{2-10}$ linear alkenyl, $C_{2-5}$ linear alkenyl, $C_{3-20}$ branched alkenyl, $C_{3-15}$ branched alkenyl, $C_{3-10}$ branched alkenyl, $C_{5-20}$ cyclic alkenyl or $C_{5-10}$ cyclic alkenyl. More specifically, the $C_{2-20}$ alkenyl may be ethenyl, propenyl, butenyl, pentenyl, or cyclohexenyl, etc.

A $C_{6-20}$ aryl means monocyclic, bicyclic or tricyclic aromatic hydrocarbon. Specifically, the $C_{6-20}$ aryl may be phenyl group, naphthyl group or anthracenyl group, etc.

A $C_{7-20}$ alkylaryl means aryl of which one or more hydrogen atoms are substituted with alkyl. Specifically, the $C_{7-20}$ alkylaryl may be methylphenyl, ethylphenyl, n-propylphenyl, iso-propylphenyl, n-butylphenyl, iso-butylphenyl, tert-butylphenyl, or cyclohexylphenyl, etc.

A $C_{7-20}$ arylalkyl means alkyl of which one or more hydrogen atoms are substituted with aryl. Specifically, the $C_{7-20}$ arylalkyl may be benzyl group, phenylpropyl or phenylhexyl, etc.

A $C_{1-20}$ alkoxy may be methoxy group, ethoxy group, phenyloxy group, cyclohexyloxy group, tert-butoxy hexyl group, etc.

The above-mentioned substituents may be optionally substituted with one or more substituents selected from the group consisting of hydroxy, halogen, alkyl, heterocycloalkyl, alkoxy, alkenyl, silyl, sulfonate, sulfone, aryl, and heteroaryl within the range that exerts the same or similar effect as the intended effect.

The hybrid supported metallocene catalyst according to the one embodiment uses the first metallocene compound represented by Chemical Formula 1 and the second metallocene compound represented by Chemical Formula 2 together, and thereby, not only it can exhibit high activity and polymerizability, but also it can slightly widen the molecular weight distribution of the synthesized olefin polymers to improve BOCD and melt flow rate ratio (MFRR) and thus ensure excellent processability. In addition, it can secure long-term physical properties such as full notch creep test (FNCT) of the synthesized olefin polymer, whereby the olefin polymer may be suitable for use as a pipe.

Specifically, in the first metallocene compound represented by Chemical Formula 1, all the 2-positions of the two indenyl groups, which are ligands, are substituted with methyl, and the 4-positions ($R_1$ and $R_5$) are substituted with phenyl substituted with alkyl, respectively, thereby exhibiting more excellent catalytic activity by an inductive effect capable of supplying sufficient electrons.

Further, as the first metallocene compound includes zirconium (Zr) as a central metal, it has more orbitals capable of accepting electrons compared to other Group 14 elements, such as hafnium (Hf), thus exhibiting features that can easily bond to monomers with higher affinity, whereby more excellent effects of improving the catalytic activity can be exhibited.

More specifically, the $R_1$ and $R_5$ in Chemical Formula 1 are each independently $C_{6-12}$ aryl substituted with $C_{1-10}$ alkyl, or phenyl substituted with $C_{3-6}$ branched alkyl, and more specifically, tert-butyl phenyl. In addition, the substitution position of the alkyl group with respect to the phenyl group may be the 4-position corresponding to the $R_1$ or $R_5$-position and the para-position bonded to the indenyl group.

Further, the $R_2$ to $R_4$ and $R_6$ to $R_8$ in Chemical Formula 1 may be hydrogen, and the $X_1$ and $X_2$ may be chloro.

Further, the A in Chemical Formula 1 may be silicon.

Further, the $R_9$ and $R_{10}$ which are substituents of A, are each independently methyl; or $C_{5-9}$ linear alkyl substituted with tert-butoxy, and at least one of $R_9$ and $R_{10}$ may be a $C_{5-9}$ linear alkyl substituted with tert-butoxy. More specifically, the $R_9$ is methyl, and $R_{10}$ may be normal-hexyl substituted with tert-butoxy.

By introducing mutually different substituents as these bridge substituents, it can exhibit catalytic activity with excellent support reactivity. Specifically, in the $R_9$ or $R_{10}$, when the $R_9$ and $R_{10}$ are the same as each other, there may be a problem that the solubility at the time of preparing the supported catalyst is not good and so the support reactivity is reduced.

A representative example of the first metallocene compound represented by Chemical Formula 1 may be the following Chemical Formula 1-1.

[Chemical Formula 1-1]

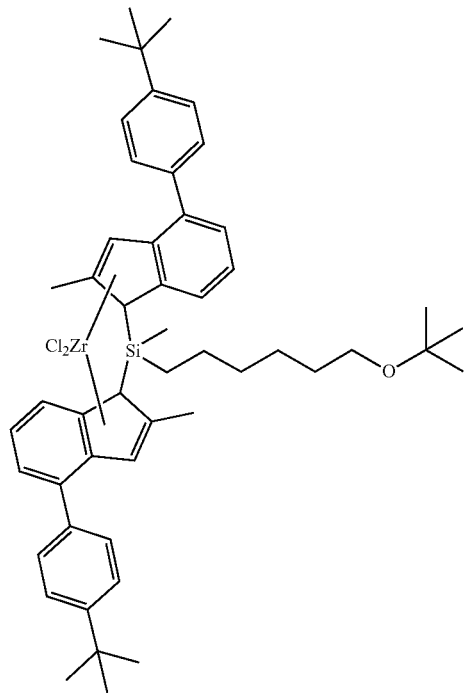

The first metallocene compound represented by Chemical Formula 1 may be synthesized by applying known reactions, and for detailed synthesis method, the examples describe below may be referred to.

Meanwhile, the second metallocene compound represented by Chemical Formula 2 has a structure in which an indenyl group and a cyclopentadienyl group are not cross-linked, and can easily control the electronic/stereoscopic environment around zirconium (Zr), which is a transition metal. As a result, properties such as the chemical structure, molecular weight distribution, and mechanical properties of the prepared olefin polymer can be easily adjusted.

Further, as the second metallocene compound includes zirconium (Zr) as a central metal, it has more orbitals capable of accepting electrons compared to other Group 14 elements, such as hafnium (Hf), thus exhibiting features that can easily bond to monomers with higher affinity, whereby more excellent effects of improving the catalytic activity can be exhibited.

More specifically, in Chemical Formula 2, at least one position of the indenyl groups (any one of $R_{11}$ to $R_{16}$) may be substituted with $C_{2-20}$ alkoxyalkyl. Specifically, $R_{11}$ or $R_{12}$ may be substituted with $C_{2-20}$ alkoxyalkyl. More specifically, $R_{11}$ or $R_{12}$ may be substituted with $C_{5-9}$ linear alkyl substituted with tert-butoxy or hexyl substituted with tert-butoxy. By substituting at least one of the indenyl groups with $C_{2-20}$ alkoxyalkyl, it can affect the copolymerizability of alpha olefin comonomers such as 1-butene, or 1-hexene, and specifically, it can slightly widen the molecular weight distribution of the synthesized olefin polymer to secure excellent processability and long-term physical properties. Furthermore, the $C_{2-20}$ alkoxyalkyl substituted with the indenyl group can form a covalent bond through close interaction with the silanol group on the silica surface used as a support, and so stable support polymerization can be performed.

Further, at least one position of the cyclopentadienyl groups (one of $R_{17}$ to $R_{20}$) may be substituted with $C_{1-20}$ alkyl, and specifically, one of $R_{18}$ and $R_{19}$ may be substituted with $C_{1-20}$ alkyl. More specifically, one of $R_{18}$ and $R_{19}$ may be substituted with normal-butyl.

Further, in Chemical Formula 2, $R_{11}$, $R_{13}$ to $R_{17}$, $R_{19}$ and $R_{20}$ may be hydrogen, and $X_3$ and $X_4$ may be chloro.

A representative example of the second metallocene compound represented by Chemical Formula 2 may be the following Chemical Formula 2-1.

[Chemical Formula 2-1]

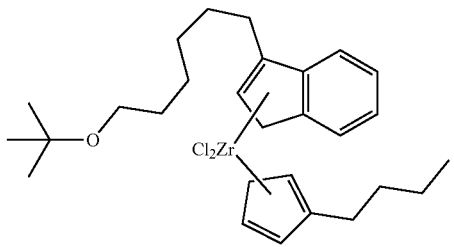

The second metallocene compound represented by Chemical Formula 2 may be synthesized by applying known reactions, and for more detailed synthesis method, the examples described below may be referred to.

Meanwhile, the first and second metallocene compounds have the above-mentioned structural characteristics and so can be stably supported on a support.

As the support, a support containing a hydroxy group or a siloxane group on the surface may be used. Specifically, as the support, supports that are dried at high temperature to remove moisture on the surface, thus containing highly reactive hydroxy groups or siloxanes groups may be used. More specifically, as the support, silica, alumina, magnesia or a mixture thereof may be used. The support may be dried at high temperature, and commonly comprise oxide, carbonate, sulfate, nitrate components such as $Na_2O$, $K_2CO_3$, $BaSO_4$ and $Mg(NO_3)_2$, etc.

The drying temperature of the support is preferably 200 to 800° C., more preferably 300 to 600° C., and most preferably 300 to 400° C. If the drying temperature of the support is less than 200° C., it remains an excess of water and thus surface moisture may react with the cocatalyst; whereas if the drying temperature is greater than 800° C., pores on the support surface may be combined together to reduce the surface area, and also a lot of hydroxy groups may be lost on the surface and only siloxane groups may remain, thus decreasing the reaction sites with the cocatalyst, which is not preferable.

The amount of the hydroxyl groups on the support surface may be preferably 0.1 to 10 mmol/g, more preferably 0.5 to 5 mmol/g. The amount of the hydroxyl groups on the support surface may be controlled by the preparation method and conditions of support, or drying conditions, for example, temperature, time, vacuum or spray drying and the like.

If the amount of the hydroxyl groups are less than 0.1 mmol/g, the reaction sites with the cocatalyst may be little, and if it is greater than 10 mmol/g, there is a possibility of being derived from moisture other than hydroxyl groups existing on the support particle surface, which is not preferable.

The hybrid supported metallocene catalyst according to the one embodiment may further include a cocatalyst for activating the transition metal compound which is a catalyst precursor. The cocatalyst is an organometallic compound containing a Group 13 metal, and is not particularly limited as long as it can be used when polymerizing an olefin under a general metallocene catalyst. Specifically, the cocatalyst may be at least one compound selected from the group consisting of compounds represented by the following Chemical Formulas 3 to 5.

$$R_{22}-[Al(R_{21})-O]_n-R_{23}$$ [Chemical Formula 3]

in Chemical Formula 3, $R_{21}$, $R_{22}$ and $R_{23}$ are each independently hydrogen, halogen, a $C_{1-20}$ hydrocarbyl group, or a $C_{1-20}$ hydrocarbyl group substituted with halogen, and n is an integer of 2 or more;

$$D(R_{24})_3$$ [Chemical Formula 4]

in Chemical Formula 4,

D is aluminum or boron, and each $R_{24}$ is independently halogen, a $C_{1-20}$ hydrocarbyl group, a $C_{1-20}$ hydrocarbyloxy group, or a $C_{1-20}$ hydrocarbyl group substituted with halogen;

$$[L-H]_+[W(A)_4]^- \text{ or } [L]^+[W(A)_4]^-$$ [Chemical Formula 5]

in Chemical Formula 5,

L is neutral or cationic Lewis base,

H is a hydrogen atom,

W is a Group 13 atom, and each A is independently one of a $C_{1-20}$ hydrocarbyl group, or a $C_{1-20}$ hydrocarbyloxy group, in which at least one hydrogen atom of the above A groups is substituted with at least one substituent selected among halogen, a $C_{1-20}$ hydrocarbyloxy group and a $C_{1-20}$ hydrocarbyl(oxy)silyl group.

Unless specifically limited herein, the following terms may be defined as follows.

A hydrocarbyl group is a monovalent functional group in which hydrogen atom is removed from hydrocarbon, and it may include an alkyl group, an alkenyl group, an alkynyl group, an aryl group, an aralkyl group, an aralkenyl group, an aralkynyl group, an alkylaryl group, an alkenylaryl group, and an alkynylaryl group, etc. And, a $C_{1-20}$ hydrocarbyl group may be a $C_{1-15}$ or $C_{1-10}$ hydrocarbyl group. Specifically, a $C_{1-20}$ hydrocarbyl group may be a linear, branched or cyclic alkyl group such as a methyl group, an ethyl group, an n-propyl group, an iso-propyl group, an n-butyl group, an iso-butyl group, a tert-butyl group, an n-pentyl group, an n-hexyl group, an n-heptyl group, a cyclohexyl group, etc.; or an aryl group such as a phenyl group, a naphthyl group, an anthracenyl group, etc.

A hydrocarbyloxy group is a functional group in which a hydrocarbyl group is bonded to oxygen. Specifically, a $C_{1-20}$ hydrocarbyloxy group may be a $C_{1-15}$ or $C_{1-10}$ hydrocarbyloxyl group. More specifically, a $C_{1-20}$ hydrocarbyloxy group may be a linear, branched or cyclic alkoxy group such as a methoxy group, an ethoxy group, an n-propoxy group, an iso-propoxy group, an n-butoxy group, an iso-butoxy group, a tert-butoxy group, an n-pentoxy group, an n-hexoxy group an n-heptoxy group, a cyclohexoxy group, etc.; or an aryloxy group such as a phenoxy group, a naphthaleneoxy group, etc.

A hydrocarbyl(oxy)silyl group is a functional group in which 1 to 3 hydrogen atoms of $-SiH_3$ are substituted with 1 to 3 hydrocarbyl groups or hydrocarbyloxy groups. Specifically, a $C_{1-20}$ hydrocarbyl(oxy)silyl group may be a $C_{1-15}$, $C_{1-10}$, or $C_{1-5}$ hydrocarbyl(oxy)silyl group. More specifically, a $C_{1-20}$ hydrocarbyl(oxy)silyl group may be an alkylsilyl group such as a methylsilyl group, a dimethylsilyl group, a trimethylsilyl group, a dimethylethylsilyl group, a diethylmethylsilyl group, a dimethylpropylsilyl group, etc.; an alkoxysilyl group such as a methoxysilyl group, a dimethoxysilyl group, a trimethoxysilyl group, a dimethoxyethoxysilyl group, etc.; or an alkoxyalkylsilyl group such as a methoxydimethylsilyl group, a diethoxymethylsilyl group, a dimethoxypropylsilyl group, etc.

Non-limiting examples of the compounds represented by the Chemical Formula 3 may include methylaluminoxane, ethylaluminoxane, isobutylaluminoxane, or tert-butylaluminoxane, etc.

And, non-limiting examples of the compounds represented by the Chemical Formula 4 may include trimethylaluminum, triethylaluminum, tri isobutylaluminum, tripropylaluminum, tributylaluminum, dimethylchloroaluminum, triisopropylaluminum, tri-sec-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminum methoxide, dimethylaluminum ethoxide, etc.

Finally, non-limiting examples of the compounds represented by the Chemical Formula 5 may include trimethylammonium tetrakis(pentafluorophenyl)borate, triethylammonium tetrakis(pentafluorophenyl)borate, N,N-dimethylanilinium tetrakis(pentafluorophenyl)borate, N,N-dimethylanilinium n-butyltis(pentafluorophenyl)borate, N,N-dimethylanilinium benzyltis(pentafluorophenyl)borate, N,N-dimethylanilinium tetrakis(4-(t-butyldimethylsilyl)-2,3,5,6-tetrafluorophenyl)borate, N,N-dimethylanilinium tetrakis(4-(triisopropylsilyl)-2,3,5,6-tetrafluorophenyl)borate, N,N-dimethylanilinium pentafluorophenoxytris(pentafluorophenyl)borate, N,N-dimethyl(2,4,6-trimethylanilinium) tetrakis(pentafluorophenyl)borate, trimethylammonium tetrakis(2,3,4,6-tetrafluorophenyl)borate, N,N-dimethylanilinium tetrakis(2,3,4,6-tetrafluorophenyl)borate, hexadecyldimethylammonium tetrakis(pentafluorophenyl)borate, N-methyl-N-dodecylanilinium tetrakis(pentafluorophenyl)borate or methyldi(dodecyl)ammonium tetrakis(pentafluorophenyl)borate, etc.

The amount of the cocatalyst used may be appropriately adjusted according to the physical properties or effects of the desired hybrid supported metallocene catalyst.

The hybrid supported metallocene catalyst according to the one embodiment can be produced, for example, by a process including a step of supporting a cocatalyst on the support, and a step of supporting the above-mentioned first and second metallocene compounds, which are catalyst precursors, on the cocatalyst-supported support.

Specifically, in the step of supporting the cocatalyst on the support, a cocatalyst-supported support can be prepared by adding a cocatalyst to a support dried at high temperature and stirring it at a temperature of about 20 to 120° C.

And, in the step of supporting the catalyst precursor on the cocatalyst-supported support, a supported catalyst can be produced by adding the first and second metallocene compounds to the cocatalyst-supported support obtained in the step of supporting the cocatalyst on the support, and again stirring the mixture at a temperature of about 20 to 120° C.

In the step of supporting the catalyst precursor on the cocatalyst-supported support, a supported catalyst can be produced by adding the first and second metallocene compounds to the cocatalyst-supported support, stirring the mixture, and then further adding the cocatalyst.

The content of the support, the cocatalyst, the cocatalyst-supported support, and the transition metal compound used in the hybrid supported metallocene catalyst according to the one embodiment may be appropriately adjusted depending on the physical properties or effects of the desired supported catalyst.

Specifically, in the hybrid supported metallocene catalyst, a molar ratio of the first metallocene compound and the second metallocene compound may be 1:1 to 15:1. By containing the first and second metallocene compounds in the above-mentioned mixing molar ratio, it is possible to provide a hybrid supported metallocene catalyst having high activity and high copolymerizability compared to a conventional one. In addition, when an olefin polymer is prepared by using the hybrid supported metallocene catalyst, it can widen the molecular weight distribution and thus improve long-term physical properties such as full notch creep test (FNCT), and improve BOCD and melt flow rate ratio (MFRR) and thus improve the processability.

However, if the molar ratio of the first metallocene compound and the second metallocene compound is less than 1:1, the copolymerizability and the processability may be deteriorated. If the molar ratio exceeds 15:1, the activity and the physical properties may be deteriorated.

In addition, in the hybrid supported metallocene catalyst according to the one embodiment, the weight ratio between the entire metallocene compound including the first and second metallocene compounds and the support may be 1:10 to 1:1,000 or 1:10 to 1:500. If the support and the metallocene compound are contained in the above-mentioned range, the optimum shape can be exhibited.

Further, when the hybrid supported metallocene catalyst further includes a cocatalyst, the weight ratio of the cocatalyst to the support may be 1:1 to 1:100 or 1:1 to 1:50. When the cocatalyst and the support are included in the above weight ratio, it is possible to optimize the activity and the polymer microstructure.

As a reaction solvent during the production of the hybrid supported catalyst, a hydrocarbon solvent such as pentane, hexane, and heptane; or alternatively, an aromatic solvent such as benzene or toluene may be used.

For more specific method for preparing the supported catalyst, the examples described below can be referred to. However, the preparation method of the supported catalyst is not limited to the content described herein, and the preparation method may further adopt a step that is ordinarily adopted in the technical field to which the present disclosure belongs. The step(s) of the preparation method may be modified by a generally changeable step(s).

Meanwhile, according to yet another embodiment, there is provided a method for preparing an olefin polymer comprising the step of subjecting an olefin monomer to a polymerization reaction in the presence of the hybrid supported metallocene catalyst.

As described above, the hybrid supported metallocene catalyst has a broad molecular weight distribution due to a specific structure, compared to an olefin polymer polymerized using a conventional metallocene compound catalyst, thus, providing an olefin polymer capable of securing excellent processability and long-term physical properties.

Examples of the olefin monomer polymerizable with the hybrid supported catalyst include ethylene, alpha-olefin, and cyclic olefin, etc., and a diene olefin-based monomer or a triene olefin-based monomer having two or more double bonds can also be polymerized. Specific examples of the monomers include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eitocene, norbornene, norbornadiene, ethylidene norbornene, phenyl norbornene, vinyl norbornene, dicyclopentadiene, 1,4-butadiene, 1,5-pentadiene, 1,6-hexadiene, styrene, alpha-methylstyrene, divinylbenzene, 3-chloromethylstyrene, etc., and two or more of these monomers may also be mixed and copolymerized. When the olefin polymer is a copolymer of ethylene and another comonomer, the comonomer is preferably one or more comonomers selected from the group consisting of propylene, 1-butene, 1-hexene, 4-methyl-1-pentene and 1-octene.

For the polymerization reaction of the olefin monomer, various polymerization processes known for a polymerization reaction of an olefin monomer, such as a continuous solution polymerization process, a bulk polymerization process, a suspension polymerization process, a slurry polymerization process, or an emulsion polymerization process, may be adopted. More specifically, the polymerization reaction may be performed in a semi-batch reactor.

Specifically, the polymerization reaction may be performed under a temperature of about 50 to 110° C. or about 60 to 100° C. and a pressure of about 1 to 100 kgf/cm$^2$ or about 1 to 50 kgf/cm$^2$.

Further, in the polymerization reaction, the hybrid supported catalyst may be used in a state of being dissolved or diluted in a solvent such as pentane, hexane, heptane, nonane, decane, toluene, benzene, dichloromethane, chlorobenzene, etc. In this case, the solvent can be treated with a small amount of alkylaluminium, etc., and thereby, a small amount of water or air, etc. that may adversely affect the catalyst can be removed in advance.

As the olefin polymer prepared by the above method is prepared by using the above-mentioned hybrid supported metallocene catalyst, it has a slightly wide molecular weight distribution and can secure excellent processability by improving the BOCD and the melt flow rate ratio (MFRR), and further can secure long-term physical properties such as full notch creep test (FNCT) of the synthesized olefin polymer.

Specifically, the olefin polymer has a melt flow rate ratio (MFRR) of 22 to 50 or 25 to 32, a full notch creep test (FNCT) of 1000 to 3000 hr or 1000 to 2000 hr, and a BOCD (broad orthogonal comonomer distribution) index of 0.8 to 3.0 or 0.9 to 1.4.

In addition, when the polymer polymerized using the above-mentioned hybrid supported catalyst is, for example, an ethylene-alpha olefin copolymer, preferably an ethylene-1-butene polymer, the above physical properties can be more appropriately satisfied.

Hereinafter, the actions and effects of the present disclosure will be explained in more detail with reference to specific examples. However, these examples are presented only as the illustration of the invention and the scope of the present disclosure is not limited thereto.

Preparation Example 1: Preparation of First Metallocene Compound (A)

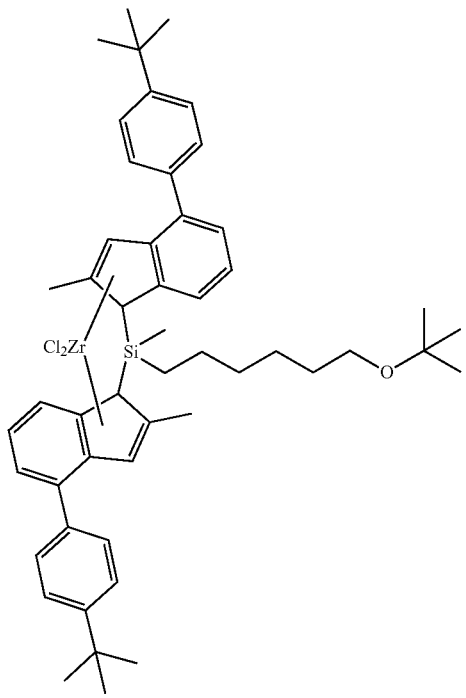

Step 1: Preparation of ((6-(t-butoxy)hexyl)methylsilane-diyl)-bis((2-methyl-4-t-butyl-phenylindenyl) silane 2-Methyl-4-t-butyl-phenylindene (10.0 g, compound 1) was dissolved in 76.2 mL of diethyl ether (Et$_2$O) and then cooled to −25° C. Then, 16.0 mL of n-butyllithium solution (2.5 M, hexane solvent) was slowly added dropwise, followed by stirring at room temperature for 4 hours. After cooling to −25° C., 1 mol % of copper cyanide (CuCN) was added, and then 2.92 mL of (6-(t-butoxy)hexyl)methyldichlorosilane was dissolved in 38 mL of diethyl ether and slowly added dropwise, and the mixture was stirred at room temperature for 16 hours. Then, dichloromethane (DCM) and water were added to separate the organic layer, and then from the organic layer, water was removed using magnesium sulfate (MgSO$_4$), filtered, and then the solvent was distilled under reduced pressure to give ((6-(t-butoxy)hexyl)methylsilane-diyl)-bis((2-methyl-4-t-butyl-phenylindenyl)silane.

Step 2: Preparation of [((6-(t-butoxy)hexyl)methylsilane-diyl)-bis((2-methyl-4-t-butyl-phenylindenyl)] zirconium Dichloride ((6-(t-butoxy)hexyl)methylsilane-diyl)-bis((2-methyl-4-t-butyl-phenylindenyl)silane prepared in step 1 was dissolved in 95.3 mL of diethyl ether (Et$_2$O), and then cooled to −25° C. 8 mL of n-butyllithium solution (2.5 M) was slowly added dropwise, followed by stirring at room temperature for 4 hours. Then, the mixture was cooled to −25° C., and 3.59 g of zirconium tetrachloride tetrahydrofuran complex [ZrCl$_4$.2THF] was added dropwise, and the mixture was stirred at room temperature for 16 hours. The solvent of the reaction solution was removed under reduced pressure, and then dichloromethane was added and filtered, and the filtrate was distilled off under reduced pressure. It was recrystallized from dichloromethane to give [((6-(t-butoxy)hexyl)methylsilane-diyl)-bis((2-methyl-4-t-butyl-phenylindenyl)] zirconium dichloride (1.0 g, yield: 14%).

Preparation Example 2: Preparation of Second Metallocene Compound (B)

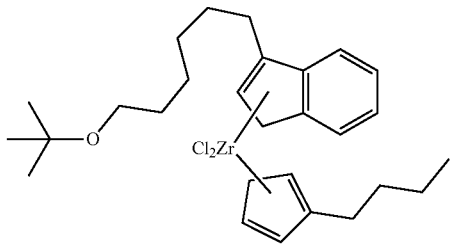

Step 1: Preparation of 3-(6-(t-butoxy)hexyl)-1H-indene 10.8 g (100 mmol) of chlorohexanol was charged into a dried 250 mL Schlenk-flask, then 10 g of molecular sieve and 100 mL of MTBE (methyl t-butyl ether) were added, and 20 g sulfuric acid was slowly added over 30 minutes. The reaction mixture slowly turned pink over time, and after 16 hours, it was poured into a saturated sodium bicarbonate solution which was cooled cold with ice. The mixture was extracted four times using 100 mL of ether, and the combined organic layer was dried over $MgSO_4$, filtered, and then the solvent was removed under reduced pressure to obtain 10 g (yield: 60%) of 1-(t-butoxy)-6-chlorohexene as a yellow liquid.

4.5 g (25 mmol) of 1-(t-butoxy)-6-chlorohexene synthesized above was charged into a dried 250 mL Schlenk-flask and dissolved in 40 mL of THF. 20 mL of sodium indenide THF solution was slowly added thereto, and then the mixture was stirred overnight. The reaction mixture was quenched by adding 50 mL of water, extracted with an ester (50 mL×3), and then the collected organic layer was sufficiently washed with brine. The remaining moisture was dried with $MgSO_4$, filtered, and then the solvent was removed under vacuum reduced pressure, thereby obtaining 3-(6-(t-butoxy)hexyl)-1H-indene as a product in dark brown viscous form in quantitative yield.

Step 2: Preparation of 3-(6-(t-butoxy)hexyl)-1H-inden-1-yl)(3-butylcyclopenta-2,4-dien-1-yl) Zirconium Dichloride 4.57 g (20 mmol) of 3-(6-(t-butoxy)hexyl)-1H-indene prepared above was charged into a dried 250 mL Schlenk-flask, and dissolved in 60 mL of ether and 40 mL of THF. 13 mL of n-BuLi 2.0M hexane solution was added thereto and stirred overnight, and then a toluene solution (concentration: 0.378 mmol/g) of n-butyl cyclopentadiene $ZrCl_3$ was slowly added at −78° C. The reaction mixture turned into a white suspension shape with a yellow solid floating in clear brown solution when raised to room temperature. After 12 hours, 100 mL of hexane was added to the reaction mixture to form another precipitate. It was then filtered under argon to obtain a yellow filtrate, which was dried, thereby confirming that the desired compound, 3-(6-(t-butoxy)hexyl)-1H-inden-1-yl)(3-butylcyclopenta-2,4-dien-1-yl) zirconium dichloride was produced.

Preparation Example 3: Preparation of Ziegler-Natta Catalyst (Z/N Catalyst)

To prepare a Ziegler-Natta catalyst, 500 kg of magnesium ethylate was dispersed in a sufficient amount of hexane, and then 1700 kg of tetrachloride titanium was slowly added dropwise over 5.5 hours at 85° C., followed by tempering at 120° C. Thereafter, unreacted by-products containing the titanium compound were removed until the titanium concentration of the entire solution became 500 mmol, and then pre-activated by contacting with triethyl aluminum at 120° C. for 2 hours, and the unreacted by-products were removed to give a final catalyst.

Example 1: Preparation of Hybrid Supported Catalyst and Olefin Polymer Using the Same (1) Preparation of Hybrid Supported Catalyst Silica (SYLOPOL 948 produced by Grace Davison) was dehydrated under vacuum at a temperature of 200° C. for 15 hours. 10 g of dried silica was charged into a glass reactor, and 100 mL of toluene was further added and stirred. 50 mL of a 10 wt % methylaluminoxane(MAO)/toluene solution was added. After raising the temperature to 60° C., the mixture was reacted with stirring for 12 hours. After lowering the temperature of the reactor to 40° C., the stirring was stopped, settling was performed for 10 minutes, and then the reaction solution was subjected to decantation. Toluene was filled up to 100 mL of the reactor, and 0.01 mmol of the first metallocene compound (A) of Preparation Example 1 was dissolved in 10 ml of toluene and added together, and reacted for 1 hour. After the reaction was completed, 0.01 mmol of the second metallocene compound (B) of Preparation Example 2 was dissolved in 10 ml of toluene, and then added together, followed by further reacting for 1 hour.

(2) Preparation of Olefin Polymer 2 ml of TEAL (1.0M hexane) and 10 g of 1-butene were charged into a 2 L autoclave high-pressure reactor, and 0.8 kg of hexane was added, and then the temperature was raised to 80° C. while stirring at 500 rpm.

50 mg of the supported catalyst prepared above and hexane were placed in a 50 mL vial and then charged into the reactor, and when the temperature inside the reactor reached 78° C., the mixture was reacted for 1 hour while stirring at 500 rpm under ethylene pressure of 9 bar. After the reaction was completed, hexane was first removed through a filter, and dried in a vacuum oven at 80° C. for 4 hours to obtain an olefin polymer.

Example 2: Preparation of Hybrid Supported Catalyst and Olefin Polymer Using the Same A hybrid supported catalyst and an olefin polymer were prepared in the same manner as in Example 1, except that the first metallocene compound (A) of Preparation Example 1 was used in an amount of 0.05 mmol in Example 1.

Example 3: Preparation of Hybrid Supported Catalyst and Olefin Polymer Using the Same A hybrid supported catalyst and an olefin polymer were prepared in the same manner as in Example 1, except that the first metallocene compound (A) of Preparation Example 1 was used in an amount of 0.1 mmol in Example 1.

Example 4: Preparation of Hybrid Supported Catalyst and Olefin Polymer Using the Same A hybrid supported catalyst and an olefin polymer were prepared in the same manner as in Example 1, except that the first metallocene compound (A) of Preparation Example 1 was used in an amount of 0.15 mmol in Example 1.

Comparative Example 1: Preparation of Hybrid Supported Catalyst and Olefin Polymer Using the Same A hybrid supported catalyst and an olefin polymer were prepared in the same manner as in Example 1, except that 0.01 mmol of the second metallocene compound (B) of Preparation Example 2 and 0.01 mmol of the metallocene compound (C) represented by the following Chemical Formula C were used at the molar ratio (1/1) shown in Table 1 below, instead of the composition (A/B) of the first and second metallocene compounds in Example 1.

[Chemical Formula C]

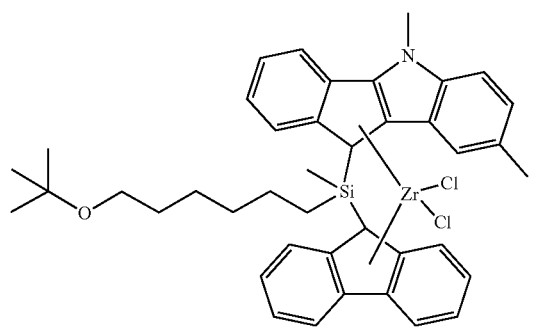

Comparative Example 2: Preparation of Olefin Copolymer Using Ziegler-Natta Catalyst An olefin polymer was prepared in the same manner as in Example 1, except that the Ziegler-Natta catalyst (Z/N catalyst) of Preparation Example 3 was used in an amount of 0.1 mmol in Example 1.

Comparative Example 3: Preparation of Supported Catalyst and Olefin Polymer Using the Same A hybrid supported catalyst and an olefin polymer were prepared in the same manner as in Example 1, except that only the first metallocene compound (A) of Preparation Example 1 was used in an amount of 0.1 mmol in Example 1.

Comparative Example 4: Preparation of Supported Catalyst and Olefin Polymer Using the Same A hybrid supported catalyst and an olefin polymer were prepared in the same manner as in Example 1, except that only the second metallocene compound (B) of Preparation Example 2 was used in an amount of 0.1 mmol in Example 1.

Comparative Example 5: Preparation of Hybrid Supported Catalyst and Olefin Polymer Using the Same A hybrid supported catalyst and an olefin polymer were prepared in the same manner as in Example 1, except that 0.01 mmol of the second metallocene compound (B) of Preparation Example 2 and 0.01 mmol of the metallocene compound (C) represented by the following Chemical Formula D were used at the molar ratio (1/1) shown in Table 1 below, instead of the composition (A/B) of the first and second metallocene compounds in Example 1.

[Chemical Formula D]

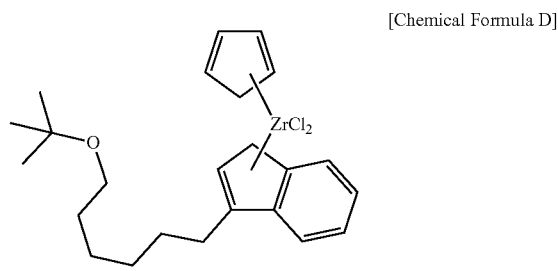

Comparative Example 6: Preparation of Hybrid Supported Catalyst and Olefin Polymer Using the Same A hybrid supported catalyst and an olefin polymer were prepared in the same manner as in Example 1, except that 0.01 mmol of a metallocene compound represented by the following Chemical Formula E and 0.01 mmol of a metallocene compound represented by the following Chemical Formula F were used at the molar ratio (1/1) shown in Table 1 below, instead of the composition (A/B) of the first and second metallocene compounds in Example 1.

[Chemical Formula E]

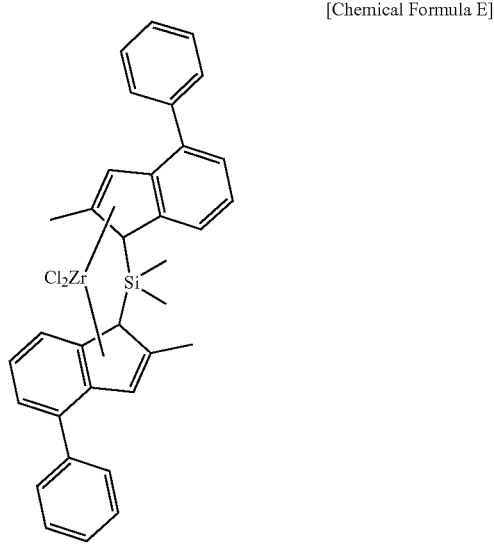

[Chemical Formula F]

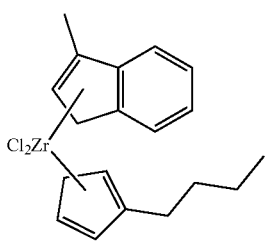

Test Example: Evaluation of Activity of Hybrid Supported Catalyst and Physical Properties of Olefin Polymer The catalytic activity, melt index, melt flow rate ratio (MFRR), full notch creep test (FNCT) and BOCD index of the catalysts and olefin polymers of Examples 1 to 4 and Comparative Examples 1 to 5 were measured by the following methods, and the results are shown in Table 1 below.

(1) Catalytic activity (kg PE/g SiO$_2$)

The catalytic activity was calculated as the ratio of the weight of produced polymer (kg PE) per catalyst content (g SiO$_2$) used per unit time (h).

(2) Melt index of the polymer (MI 2.16)

Melt index (MI 2.16) was measured at 190° C. under a load of 2.16 kg according to ASTM D 1238 and expressed as the weight (g) of polymer melted and discharged for 10 minutes.

(3) Melt flow rate ratio (MFRR: MFR$_{20}$/MFR$_2$): it is the ratio of MFR$_{20}$ melt index (MI, load of 21.6 kg) divided by MFR$_2$ (MI, load of 2.16 kg).

(4) BOCD Index (Broad Orthogonal Co-monomer Distribution index): In the analysis of the GPC-FTIR measurement results, the SCB content (unit: number/1,000 C) was measured within a range of 30% (total 60%) on the left and right sides of the molecular weight distribution (MWD) based on the weight average molecular weight (Mw). The BOCD index was calculated by the following Mathematical Formula 1.

BOCD Index=(SCB Content on High MW Side− SCB Content on Low MW Side)/(SCB Content on Low MW Side)　　　[Mathematical Formula 1]

(※ MW: molecular weight)

(5) Full notch creep test (FNCT, hr): As an evaluation method of molded articles of ethylene polymer, the test method for the full notch creep test is described in M. Flissner in Kunststoffe 77 (1987), pp. 45 et seq. and this corresponds to ISO/FDIS 16770 that is currently in force. In respect to ethylene glycol, which was a stress crack promotion medium using tension of 3.5 Mpa at 80° C., and the breakage time was reduced due to the reduction in the stress initiation time by the notch (1.6 mm/safety razor blade).

For the preparation of the specimens, 750 ppm of a primary antioxidant (Irganox 1010, CIBA), 1500 ppm of a secondary antioxidant (Irgafos 168, CIBA) and 1000 ppm of a processing aid (SC110, Ca-St, Duboon Yuhaw Inc.) were added to each ethylene polymers (PE) of Examples and Comparative Examples, and granulation was performed at an extrusion temperature of 170° C. to 220° C. using a twin screw extruder (W&P Twin Screw Extruder, 75 pie, L/D=36). The extruding test for the processability of the resin was performed under the conditions of 190 to 220° C. (Temp. Profile (° C.): 190/200/210/220) by using a Haake Single Screw Extruder (19 pie, L/D=25). In addition, the pipe was extruded and molded at an extrusion temperature of 220° C. by using a single screw extruder (Battenfeld Pipe M/C, 50 pie, L/D=22, compression ratio=3.5) so that the outer diameter was 32 mm and the thickness was 2.9 mm.

Subsequently, three specimens having a size of 10 mm (width), 10 mm (height) and 90 mm (length) were manufactured by sawing the specimens from the plate compressed to have the thickness of 10 mm. In order to achieve this object, the safety razor blade was used in the notch device specifically manufactured and the central notch was provided to the specimen. The depth of the notch was 1.6 mm.

TABLE 1

| Precursor | Catalyst | A/B Ratio | Activity (KgPE/gSiO$_2$) | MI 2.16 | MFRR | BOCD index | FNCT (hr) |
|---|---|---|---|---|---|---|---|
| Example 1 | A/B | 1/1 | 23 | 0.6 | 25 | 0.9 | 1000 |
| Example 2 | A/B | 5/1 | 22 | 0.6 | 28 | 1.1 | 1700 |
| Example 3 | A/B | 10/1 | 20 | 0.5 | 30 | 1.4 | 2000 |
| Example 4 | A/B | 15/1 | 17 | 0.3 | 32 | 1.3 | 1800 |
| Comparative Example 1 | B/C | 1/1 | 10 | 0.2 | 20 | 0.5 | 700 |
| Comparative Example 2 | Z/N catalyst | — | 11 | 0.4 | 18 | 0.1 | 800 |
| Comparative Example 3 | A | — | 10 | 0.02 | 12 | 0.6 | 700 |
| Comparative Example 4 | B | — | 25 | 5.0 | 5 | 0.1 | 10 |
| Comparative Example 5 | B/D | 1/1 | 12 | 17 | 18 | 0.5 | 600 |
| Comparative Example 6 | E/F | 1/1 | 8 | 3.0 | 15 | 0.5 | 30 |

As shown in Table 1, it was confirmed that the polymers of Examples 1 to 4 of the present disclosure exhibited a high activity by using a supported catalyst using a combination of specific precursors. In addition, it was confirmed that in the polymers of Examples 1 to 4, all of MFRR, BOCD and FNCT were remarkably superior to those of Comparative Examples, and thus, a polymer for pipes with improved processability and long-term physical properties could be provided.

The invention claimed is:

1. A hybrid supported metallocene catalyst, comprising:
   a first metallocene compound represented by the following Chemical Formula 1;
   a second metallocene compound represented by the following Chemical Formula 2; and
   a support supporting the first and second metallocene compounds,
   wherein a molar ratio of the first metallocene compound and the second metallocene compound is 1:1 to 15:1,

[Chemical Formula 1]

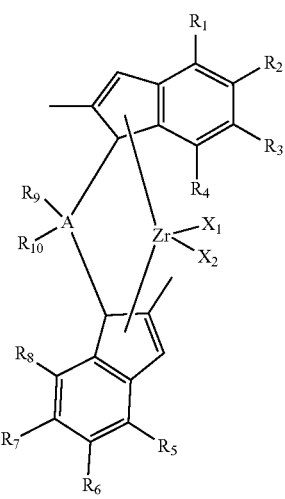

in Chemical Formula 1,
$X_1$ and $X_2$ are each independently halogen,
$R_1$ and $R_5$ are each independently $C_{6-20}$ aryl substituted with $C_{1-20}$ alkyl,
$R_2$ to $R_4$ and $R_6$ to $R_8$ are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silyl ether, $C_{1-20}$ alkoxy, $C_{6-20}$ aryl, $C_{7-20}$ alkylaryl, or $C_{7-20}$ arylalkyl,
A is carbon, silicon or germanium, and
$R_9$ and $R_{10}$ are each independently $C_{1-2}$ linear alkyl, or $C_{3-10}$ linear alkyl substituted with $C_{1-10}$ alkoxy, wherein at least one of $R_9$ and $R_{10}$ is $C_{3-10}$ linear alkyl substituted with $C_{1-10}$ alkoxy,

[Chemical Formula 2]

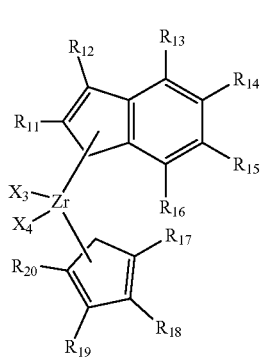

in Chemical Formula 2,
$X_3$ and $X_4$ are each independently halogen,
$R_{11}$ to $R_{20}$ are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silyl ether, $C_{1-20}$ alkoxy, $C_{2-20}$ alkoxyalkyl, $C_{6-20}$ aryl, $C_{7-20}$ alkylaryl, or $C_{7-20}$ arylalkyl,
wherein at least one of $R_{11}$ and $R_{12}$ is $C_{2-20}$ alkoxyalkyl, and
at least one of $R_{17}$ to $R_{20}$ is $C_{1-20}$ alkyl.

2. The hybrid supported metallocene catalyst of claim 1, wherein the $R_1$ and $R_5$ are each independently phenyl substituted with $C_{3-6}$ branched alkyl.

3. The hybrid supported metallocene catalyst of claim 1, wherein the $R_9$ and $R_{10}$ are each independently methyl, or $C_{5-9}$ linear alkyl substituted with tert-butoxy, wherein at least one of $R_9$ and $R_{10}$ is a $C_{5-9}$ linear alkyl substituted with tert-butoxy.

4. The hybrid supported metallocene catalyst of claim 1, wherein the first metallocene compound represented by Chemical Formula 1 is the following Chemical Formula 1-1

[Chemical Formula 1-1]

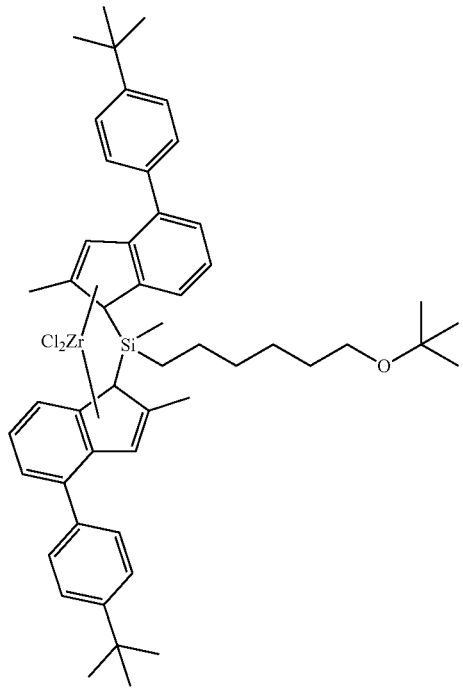

5. The hybrid supported metallocene catalyst of claim 1, wherein $R_{12}$ is a $C_{5-9}$ linear alkyl substituted with tert-butoxy.

6. The hybrid supported metallocene catalyst of claim 1, wherein one of $R_{18}$ and $R_{19}$ is normal-butyl.

7. The hybrid supported metallocene catalyst of claim 1, wherein the second metallocene compound represented by Chemical Formula 2 is the following Chemical Formula 2-1

[Chemical Formula 2-1]

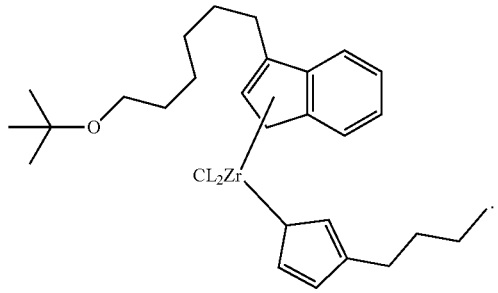

8. The hybrid supported metallocene catalyst of claim 1, wherein the support includes any one selected from the group consisting of silica, alumina and magnesia, or a mixture of two or more thereof.

9. The hybrid supported metallocene catalyst of claim 1, further comprising:

at least one cocatalyst selected from the group consisting of compounds represented by the following Chemical Formulas 3 to 5:

$$R_{22}-[Al(R_{21})-O]_n-R_{23} \quad \text{[Chemical Formula 3]}$$

in Chemical Formula 3,
$R_{21}$, $R_{22}$ and $R_{23}$ are each independently hydrogen, halogen, a $C_{1-20}$ hydrocarbyl group, or a $C_{1-20}$ hydrocarbyl group substituted with halogen, and
n is an integer of 2 or more, $$D(R_{24})_3 \quad \text{[Chemical Formula 4]}$$

in Chemical Formula 4,
D is aluminum or boron, and
each $R_{24}$ is independently halogen, a $C_{1-20}$ hydrocarbyl group, a $C_{1-20}$ hydrocarbyloxy group, or a $C_{1-20}$ hydrocarbyl group substituted with halogen, $$[L-H]^+[W(A)_4]^- \text{ or } [L]^+[W(A)_4]^- \quad \text{[Chemical Formula 5]}$$

in Chemical Formula 5,
L is neutral or cationic Lewis base,
H is a hydrogen atom,
W is a Group 13 atom, and
each A is independently one of a $C_{1-20}$ hydrocarbyl group, or a $C_{1-20}$ hydrocarbyloxy group, wherein at least one hydrogen atom of the $C_{1-20}$ hydrocarbyl group and the $C_{1-20}$ hydrocarbyloxy group is substituted with at least one substituent selected among halogen, a $C_{1-20}$ hydrocarbyloxy group and a $C_{1-20}$ hydrocarbyl(oxy)silyl group.

10. A method for preparing an olefin polymer comprising: polymerizing an olefin monomer in the presence of a hybrid supported metallocene catalyst of claim 1.

11. The method for preparing the olefin polymer of claim 10, wherein the polymerization is performed in a semi-batch reactor.

12. The method for preparing the olefin polymer of claim 10, wherein the olefin monomer includes at least one selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eitocene, norbornene, norbornadiene, ethylidene norbornene, phenyl norbornene, vinyl norbornene, dicyclopentadiene, 1,4-butadiene, 1,5-pentadiene, 1,6-hexadiene, styrene, alpha-methylstyrene, divinylbenzene and 3-chloromethylstyrene.

* * * * *